Oct. 1, 1968 R. C. REESE ET AL 3,403,442

DEVICE FOR SCORING GLASS ARTICLES

Filed Oct. 17, 1966 3 Sheets-Sheet 1

INVENTORS
Robert C. Reese
Peter E. Wesel
BY William D. Fosdick
AGENT

DEVICE FOR SCORING GLASS ARTICLES

INVENTORS
Robert C. Reese
Peter E. Wesel
BY William D. Fosdick
AGENT

DEVICE FOR SCORING GLASS ARTICLES

Filed Oct. 17, 1966 3 Sheets-Sheet 3

INVENTORS
Robert C. Reese
Peter E. Wesel
BY William D. Fosdick
AGENT

United States Patent Office 3,403,442

Patented Oct. 1, 1968

3,403,442

DEVICE FOR SCORING GLASS ARTICLES

Robert C. Reese and Peter E. Wesel, Corning, N.Y., assignors to Corning Glass Works, Corning, N.Y., a corporation of New York Filed Oct. 17, 1966, Ser. No. 587,324
4 Claims. (Cl. 30—164.95)

ABSTRACT OF THE DISCLOSURE

A device for forming external circumferential score lines on glass pipe. A cutting edge is resiliently mounted on a support which is in turn resiliently mounted on a frame member. A guide portion of the support is in continuous contact with the glass surface, thereby insuring uniformity in the pressure of the cutting edge against the glass.

Figure 1:
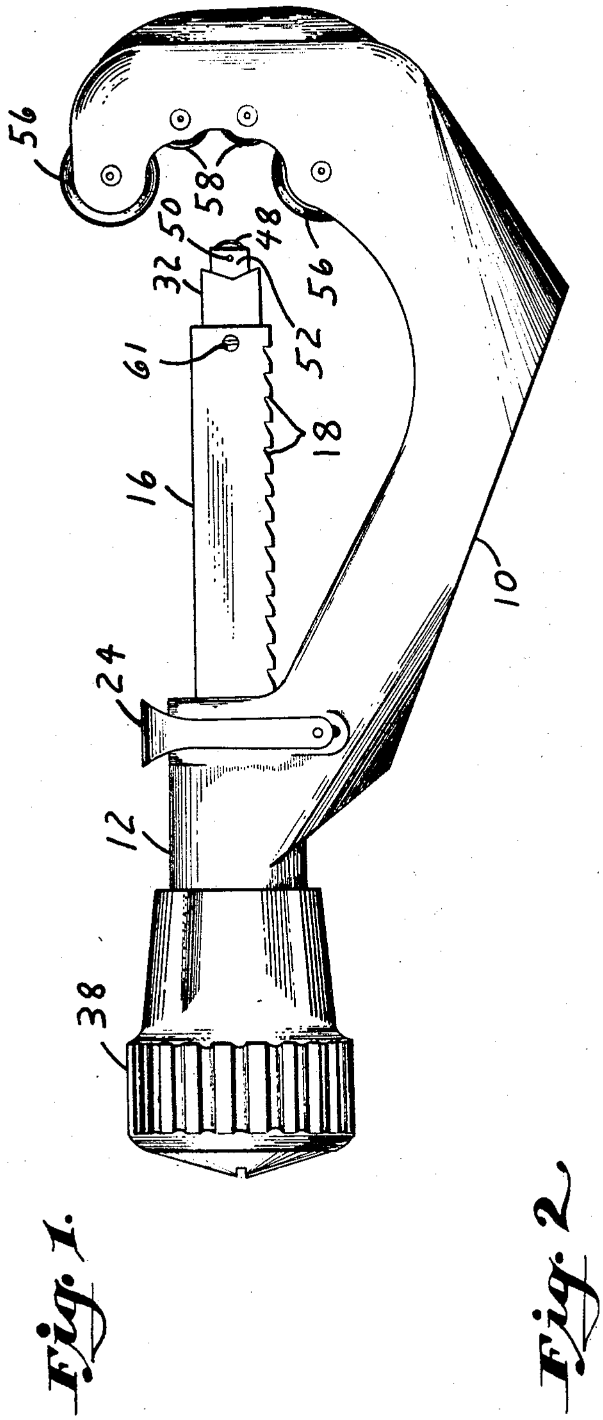

This invention relates to a device for forming score lines in the surfaces of glass articles, and more particularly to a device for forming external score lines of extremely uniform width and depth around the outer circumference of glass pipe.

A common and effective method for severing thin-walled glass articles, such as plate glass and glass pipe, involves the formation of a small groove, or score line, in a surface of the article along a path where severance is desired and the subsequent application of thermal or mechanical stress in the vicinity of the score line to produce fracture along that line. A particularly effective method for severing glass pipe involves the formation of a circumferential score line in the outer surface of the pipe and the subsequent application of heat to the inner surface of the pipe in the vicinity of the score line to produce a thermal stress to fracture the pipe along the score line.

It is well known that when glass is cut by processes involving the formation of a score line and the subsequent application of stress along the score line, the precision with which a line of fracture follows the score line is a direct function of the degree of uniformity in depth and width of the score line. Since the depth and width of the score line are functions of the force with which the cutting edge is pressed against the glass, it is necessary, in order to obtain a uniform line, to maintain a constant force on the cutting edge. Inasmuch as it is difficult to produce glass articles having extremely uniform surfaces, a score line of uniform depth and width cannot be obtained by simply drawing a cutting edge along a path parallel to the theoretical surface of the article. In particular, since external score lines on glass pipe are formed by effecting relative rotation between the pipe and a cutting edge, and since glass pipe is seldom precisely circular in cross section, a uniform score line can be obtained neither by simple rotation of the pipe about its axis while the external surface of the pipe is in contact with a rigidly supported cutting edge nor by rotation of the cutting edge in a circular path about the circumference of the pipe.

Previous attempts to construct scoring devices having the ability to compensate for deviations from noncircularity in pipe cross-section have involved the use of scoring devices which include cutting edges mounted on single springs. Such devices have substantially reduced variation in the depth and width of score lines produced thereby. However, since such devices compensate for noncircularity in pipe cross-section by differential spring compression or elongation, and since the force exerted by a spring varies with the distance by which the spring is compressed or elongated, such devices have not produced completely uniform force on the pipe. Therefore, the score lines produced thereby have not been perfectly uniform.

It is an object of the present invention to provide a scoring device for glass articles which is of simple construction and wherein a scoring or cutting edge is maintained in continuous contact with the outer surface of a glass article with extremely uniform force, thereby permitting the cutting of an extremely precise score line along the article.

A further object is the provision of a pipe scoring device wherein a scoring edge can be maintained in continuous contact with the outer surface of a glass pipe section with extremely uniform force, thereby permitting the cutting of an extremely precise circumferential score line about the pipe.

These and other objects, which will be apparent from the detailed description of the invention, are accomplished by the provision of a scoring device which includes a cutting edge resiliently mounted on a support which is in turn resiliently mounted on a frame member. This arrangement permits a guide portion of the support to be maintained in continuous contact with the surface being scored, while the resilient mounting of the cutting edge with respect to the guide portion maintains the cutting edge against the glass surface with a uniform force.

Figure 2:
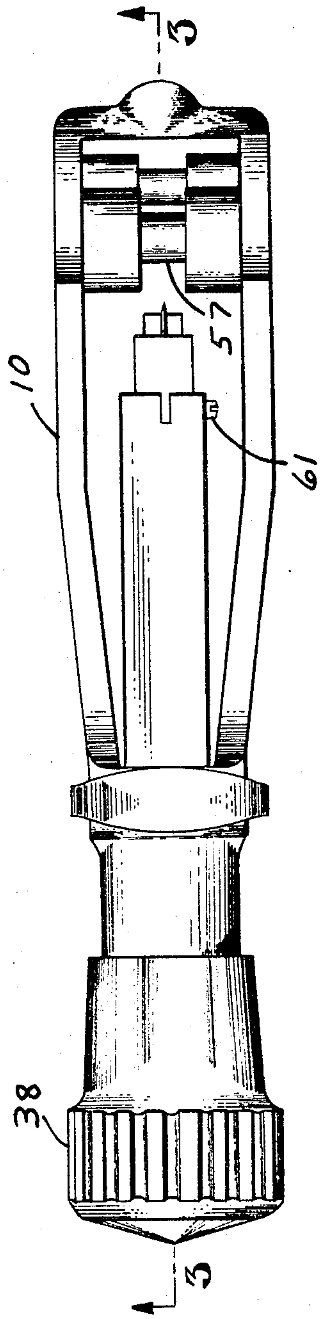
Figures 3, 4, 5, 6, 7, 8:
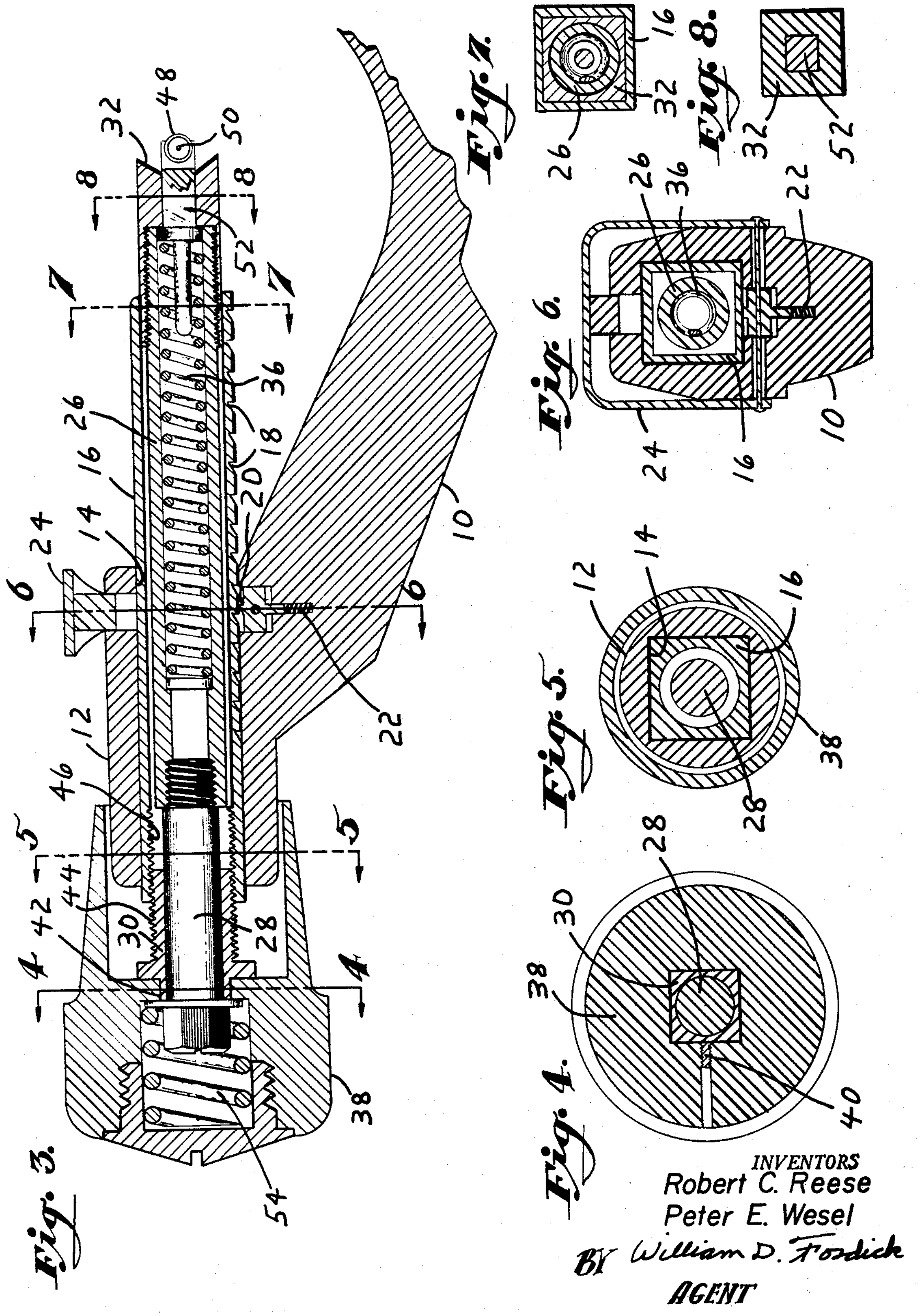
Figure 9:
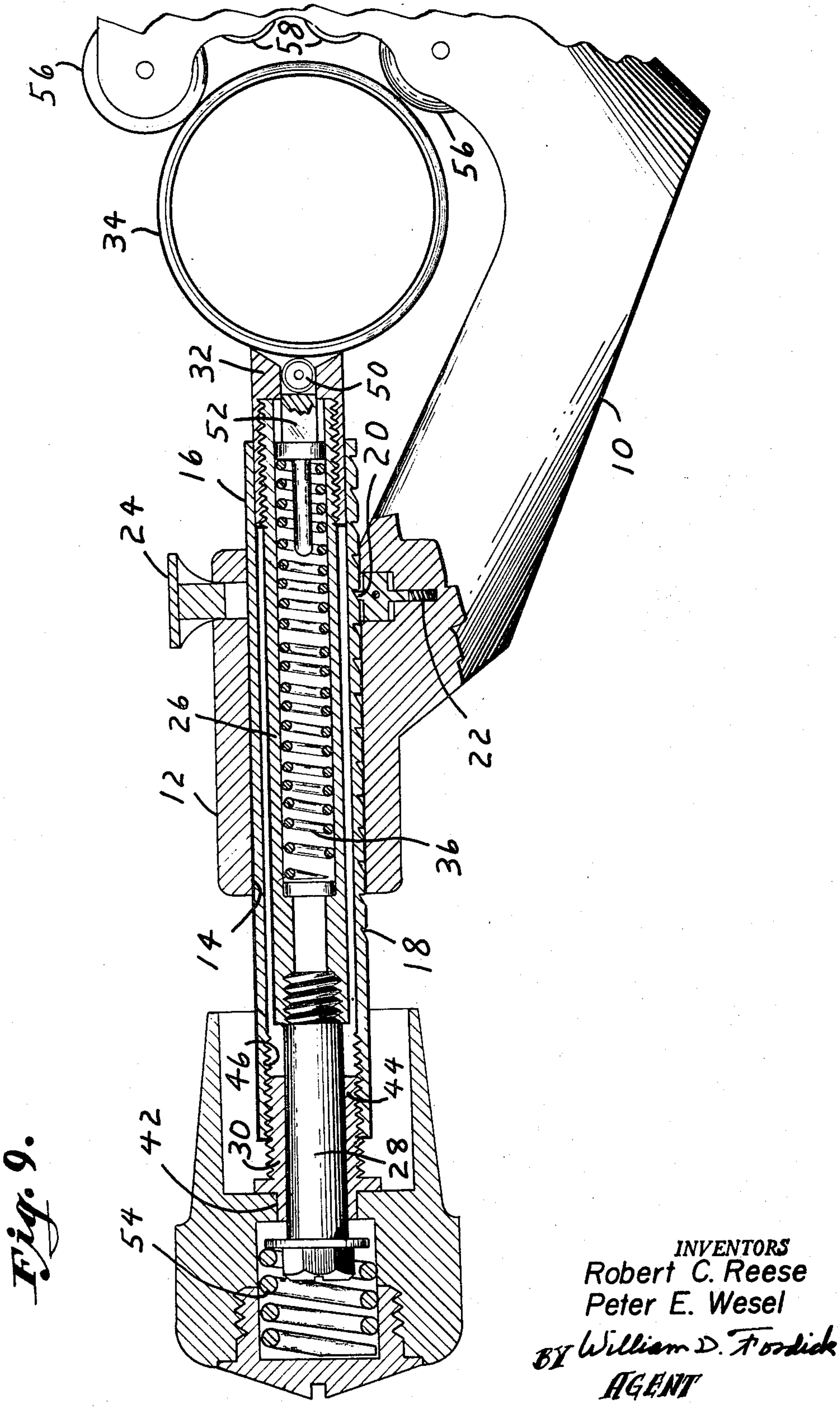

The invention will be described with reference to the accompanying drawing, in which:

FIGURE 1 is a side elevational view of a pipe scoring device according to the invention, FIGURE 2 is a top plan view of the device of FIGURE 1, FIGURE 3 is a partial sectional view taken on line 3—3 of FIGURE 2, FIGURE 4 is a sectional view taken on line 4—4 of FIGURE 3, FIGURE 5 is a sectional view taken on line 5—5 of FIGURE 3, FIGURE 6 is a sectional view taken on line 6—6 of FIGURE 3, FIGURE 7 is a sectional view taken on line 7—7 of FIGURE 3, FIGURE 8 is a sectional view taken on line 8—8 of FIGURE 3, and FIGURE 9 is a sectional view similar to that of FIGURE 3, illustrating the device in operative relation to a section of glass pipe supported thereby.

Referring to the drawing, a pipe scoring device according to the invention comprises a frame member 10 having a sleeve portion 12 having formed therein a channel 14 which is square in cross-section. Carriage 16, having an outer surface complementary with the inner surface of sleeve portion 12, is slidable through the sleeve portion to permit gross adjustment of the carriage with respect to the frame member. One surface of carriage 16 is in the form of a ratchet bar having indentations 18 which interact with pawl 20 to prevent movement of carriage 16 in a direction away from pipe-supporting rollers 56 and 58 when the pawl is maintained in an indentation by means of spring 22. The pawl is disengaged from the ratchet bar by manual pressure on release bar 24, which pressure compresses spring 22.

Cutter support 26 is supported from the end of bolt 28. Bolt 28 is, in turn, longitudinally slidable through bushing 30, thereby permitting cutter support 26 to move longitudinally within carriage 16. Cutter support 26 has a glass-contacting guide portion 32 which is preferably formed of a material softer than glass for example, brass, in order to prevent scratching of the glass surface by the guide portion. Guide portion 32 is maintained tightly against the outer surface of glass pipe section 34 by means of helical cutter support spring 54. Adjusting handle 38 is rigidly connected to bushing 30 by means of set screw 40, illustrated in FIGURE 4. Since bushing 30 has an end portion 42 with a square external cross-section which passes through a square channel in handle 38 complementary thereto, when handle 38 is rotated, bushing 30 rotates along with it. Since bushing 30 has a threaded cylindrical end portion 44 in threaded engagement with a cylindrical threaded internal surface portion 46 of carriage 16, when handle 38 is rotated, cutter support 26 moves longitudinally within carriage 16. Since the outer surface of bolt 28 and the inner surface of bushing 30 are circular in cross-section, cutter support 26 does not rotate during its longitudinal movement.

Cutting wheel 48 is rotatably supported on pin 50, which is in turn supported from cutter support block 52. Cutter support block 52 is slidably supported in guide portion 32 of cutter support 26. Due to the square internal cross-section of guide portion 32 and the square external cross-section of cutter support block 52, rotation of the cutter support block with respect to cutter support 26 is prevented. Helical cutter spring 36, coaxial with cutter support spring 54, maintains cutter wheel 48 against the outer surface of glass pipe section 34.

In order to operate the illustrated pipe scoring device, a section of pipe to be scored is first brought into contact with rollers 56. Next, a gross adjustment of the cutter support is made by pressing handle 38 in the direction of the pipe, thereby moving the handle, carriage 16 and cutter support 26 as a single unit in the direction of the pipe. When carriage 16 has been moved as far as the pipe will permit, it is maintained in that position by means of pawl 20, interacting with indentations 18 in the ratchet bar formed on the bottom of the carriage. Next, the handle is rotated in order to cause bushing 30, which, as previously pointed out, is fixed to the handle, to be threaded into inner threaded surface portion 46 of the carriage. The effect of the rotation is to move handle 38 in the direction of the pipe. At the instant of initial contact between cutter 48 and pipe 34, springs 36 and 54 are in the positions illustrated in FIGURE 3. As rotation of the handle is continued, spring 36 progressively compresses, until guide portion 32 contacts the pipe. At the instant of contact between guide portion 32 and the pipe, spring 36 has been compressed as far as it will be compressed during the operation of the device. As rotation of the handle continues further, spring 54 is compressed to the position illustrated in FIGURE 9, at which position variations in the diameter of the pipe will cause the spring to become compressed either more or less to correspond with movements of cutter support 26 in response to such diameter variations. Rotation of the handle continues for an arbitrary number of rotations, for example, three rotations, subsequent to the initial contact between guide portion 32 and the pipe. At this time a predetermined force exists between the guide portion and the pipe, and variations in pipe diameter will result in variations in the degree of compression of spring 54. Relative rotation between the scoring device and the glass pipe is subsequently effected through 360°. The pipe is then removed from the device by pressing release bar 24, thereby permitting the springs to force the carriage and the cutter support away from the pipe. Retaining screw 61 projects outwardly from cutter support 26 in order to prevent accidental complete removal of the cutter support from frame member 10. The pipe is subsequently fractured along the score line produced by the device. Such fracture may be effected by conventional methods such as mechanical or thermal crack-off.

As previously pointed out, an advantage of the present scoring device is its ability to form a score line of extremely uniform depth and width. This ability results from the fact that an extremely uniform force is maintained on the cutting wheel. The uniform force results from the fact that spring 54 maintains guide portion 32 in continuous contact with the outer surface of the glass. Because cutter support 26 is subjected to two forces, i.e., the force of cutter support spring 54 which tends to urge the cutter support toward the glass pipe and the force of cutter spring 36, which tends to urge the cutter support away from the glass pipe, as long as the force exerted by cutter support spring 54 is greater than that exerted by cutter spring 36, there will be a net resultant force which maintains the cutter support guide portion 32 continuously and firmly against the pipe. This disparity in forces is produced by rotation of the handle to compress spring 54 further after initial contact between the guide portion and the glass surface. As long as end 32 is in contact with the pipe, the amount of the compression of cutter spring 36 is uniform, since the amount of compression of cutter spring 36 does not vary when guide portion 32 moves in response to variation in glass pipe diameter.

In order to minimize the amount of movement of the handle required to bring the cutter and cutter support into operative position, it is preferable that spring 54 be maintained within the device at a degree of compression substantially greater than that of spring 36, a preferred ratio of compressive forces being approximately 3:1.

Rollers 56 and 58 are provided with central grooves 57 in order to prevent small glass particles produced during the scoring operation from being pressed against the glass surface by the rollers. Rollers 58, although not utilized when large diameter pipe is being scored, are useful in supporting pipe too small to be brought into contact with both of rollers 56.

Although the invention has been described with reference to its preferred embodiment, i.e., a device for scoring cylindrical glass pipe, it will be appreciated that devices according to the invention have utility in the scoring of glass articles of other shapes. Variations in the exact structure of the device may be made within the spirit of the invention in order to accommodate the device and its operation to glass articles of other shapes. Accordingly, it is intended that the scope of the invention be limited only by the scope of the appended claims.

We claim:

1. A device for forming a circumferential score line about the outer surface of glass pipe, said device comprising:

a frame member having a pipe support means for supporting one side of a pipe section, a hollow carriage member extending through a sleeve in said frame member generally opposite said pipe support means, means for positioning said carriage member at a plurality of locations at varying distances from said pipe support means, a cutter support in telescoping relationship with said carriage member, a guide portion on said cutter support projecting in the direction of said pipe support means and adapted to bear against a glass surface, a cutter projecting outwardly from said guide portion, first resilient connecting means between said cutter and said cutter support, second resilient connecting means coaxial with said first resilient connecting means and providing a resilient connection between said cutter support and said carriage, and means operatively connected to said carriage for applying a force to said second resilient connecting means to move said cutter support resiliently in the direction of said pipe support means.

2. A device according to claim 1 in which said second resilient connecting means comprises a handle portion in threaded engagement with said carriage member and a spring in compression between said handle and said cutter support tending to urge said cutter support in the direction of said pipe support means.

3. A device according to claim 2 in which said cutter support has a hollow bore and said first resilient connecting means comprises a spring in compression therein.

4. A device according to claim 3 in which said first and second resilient connecting means comprise coaxial helical springs.

References Cited

UNITED STATES PATENTS

| | | | |
|---|---|---|---|
| 1,448,877 | 3/1923 | Smith | 30—94 |
| 1,897,374 | 2/1933 | Goebel | 30—102 |
| 2,448,578 | 9/1948 | Condon | 30—95 |
| 3,022,575 | 2/1962 | Wright | 30—102 |

ROBERT C. RIORDON, *Primary Examiner.*

R. V. PARKER, Jr., *Assistant Examiner.*